US007715707B2

(12) United States Patent
Huang

(10) Patent No.: US 7,715,707 B2
(45) Date of Patent: May 11, 2010

(54) ZOOM RATIO ADJUSTING SWITCH

(75) Inventor: Heng-Hsing Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 328 days.

(21) Appl. No.: 11/959,147

(22) Filed: Dec. 18, 2007

(65) Prior Publication Data

US 2008/0285151 A1 Nov. 20, 2008

(30) Foreign Application Priority Data

May 16, 2007 (CN) ........................ 2007 1 0200625

(51) Int. Cl.
*G03B 17/00* (2006.01)

(52) U.S. Cl. ........................................ 396/543; 396/85

(58) Field of Classification Search ................... 396/85, 396/88, 439, 543
See application file for complete search history.

(56) References Cited

U.S. PATENT DOCUMENTS 6,018,632 A * 1/2000 Takamura .................... 396/85
2002/0056611 A1 5/2002 Oba et al.

FOREIGN PATENT DOCUMENTS

JP 200316879 A 1/2003

* cited by examiner

*Primary Examiner*—Rodney E Fuller
(74) *Attorney, Agent, or Firm*—Zhigang Ma

(57) ABSTRACT

An exemplary zoom ratio adjusting switch includes a panel, a rotary member and a spring. The panel defines first and second grooves whose innermost extremities are on a circumference of a circle. Each groove includes a wide part and a narrow part. The rotary member includes a body positioned to a top side of the panel and first and second locking legs extending from the body. The first and second locking legs extend though the wide parts and slide in the narrow parts respectively. Feet extend from the locking legs respectively at the bottom side of the panel and are restrained at the bottom side of the panel. The spring is positioned to the bottom side of the panel and restrains travel of the first locking leg from the narrow part to the wide part of the first groove.

11 Claims, 6 Drawing Sheets

ZOOM RATIO ADJUSTING SWITCH

BACKGROUND

1. Technical Field

The present invention relates to an optical device with a zoom lens and, particularly, to a zoom ratio adjusting switch.

2. Description of Related Art

Various types of compact cameras equipped with zoom lenses have been put on the market. Motor driven compact cameras of this kind are equipped with a zoom ratio adjusting switch for actuating an electric motor to drive the zoom lens to adjust a zoom ratio.

One conventional zoom ratio adjusting switch comprises a camera panel and a rotary member. The panel defines three arc-shaped and elongated grooves therethrough, which are uniformly arranged in the panel, adjoining an outermost portion of a round region of the panel. The rotary member comprises a base attached to a side of the round region of the panel, and three elastic fingers extending perpendicularly from the base. The elastic fingers respectively elastically extend through the grooves and grasp an opposite side of the round region of the panel, to thereby secure the rotary member to the panel. The elastic fingers can slide in the grooves along a circumferential direction of the round region of the panel. Thus, the rotary member is kept in a neutral position until acted on by a force to rotate between a tele-angle end position and a wide-angle end position. Specifically, the electric motor rotates in one direction to shift the zoom lens toward the telephoto side while the rotary member is turned toward the tele-angle end position, and rotates in a reverse direction to shift the zoom lens toward the wide-angle end while the rotary member is turned to the wide-angle end position.

In order to firmly secure the rotary member to the panel, a diameter of the round region of the panel must be slightly larger than a diameter of a circle defined by innermost extremities of the elastic fingers. The elastic fingers must be expanded outwardly to extend through the grooves in the panel, and then rebound to grasp said opposite side of the round region of the panel. However, the elastic fingers are slim and at risk of being broken due to excessive force or deformation. As a result, the zoom ratio adjusting switch is unreliable.

What is needed, therefore, is a zoom ratio adjusting switch which is reliable and durable.

SUMMARY

In accordance with a present embodiment, a zoom ratio adjusting switch includes a panel, a rotary member, and a spring. The panel defines first and second grooves whose innermost extremities are on a circumference of a circle. Each groove includes a wide part and a narrow part. The rotary member includes a body positioned to a top side of the panel and first and second locking legs extending from the body. The first and second locking legs extend though the wide parts and slide in the narrow parts respectively. Feet extend from the locking legs respectively at the bottom side of the panel and are restrained at the bottom side of the panel. The spring is positioned to the bottom side of the panel and restrains travel of the first locking leg from the narrow part to the wide part of the first groove.

Other advantages and novel features will be drawn from the following detailed description of at least one preferred embodiment, when considered in conjunction with the attached drawings.

DETAILED DESCRIPTION OF THE PREFERRED EMBODIMENT

An embodiment of the present zoom ratio adjusting switch will now be described in detail below and with reference to the drawings.

Figure 1:
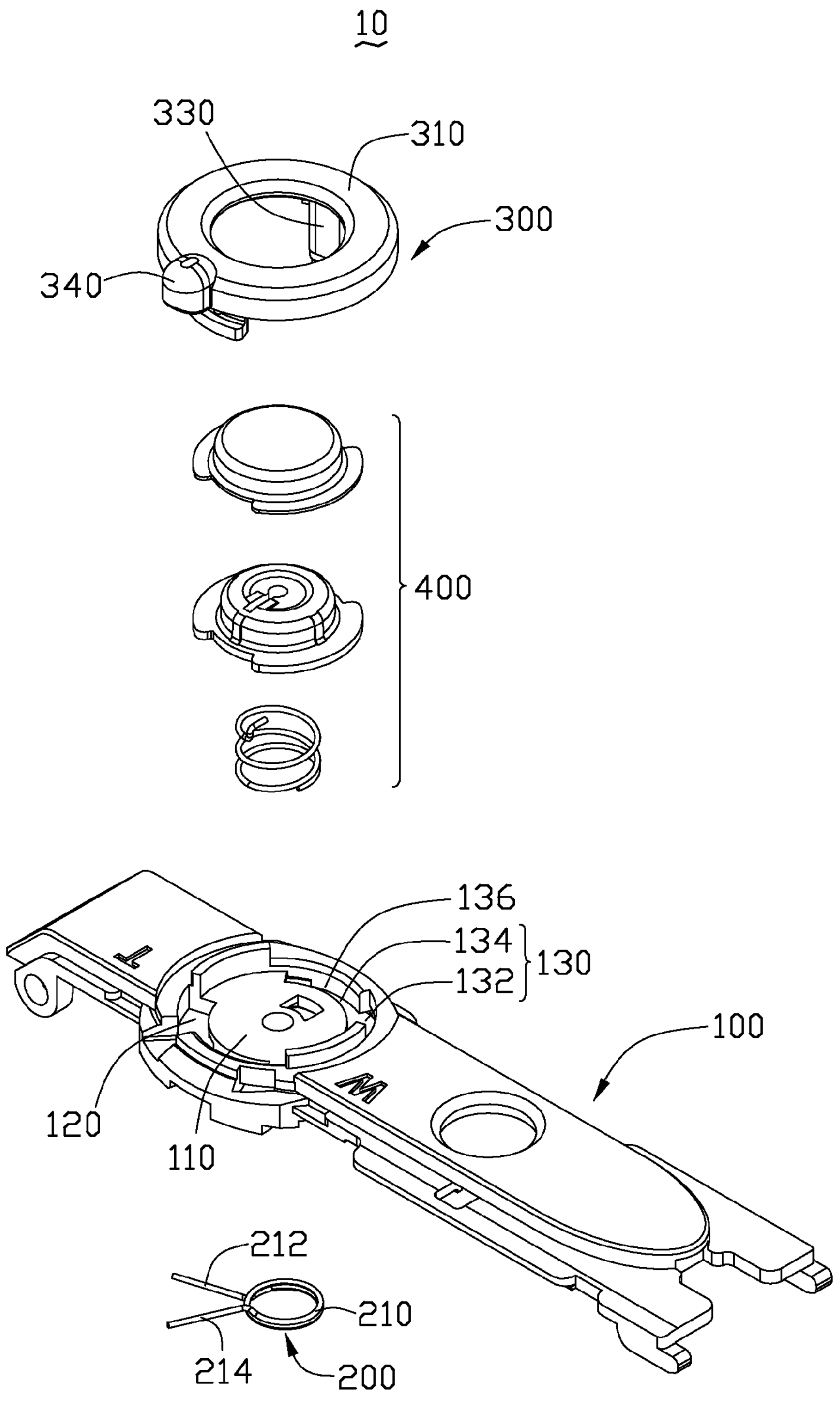
FIG. 1 is an exploded, isometric view of a zoom ratio adjusting switch, according to a preferred present embodiment.
Figure 2:
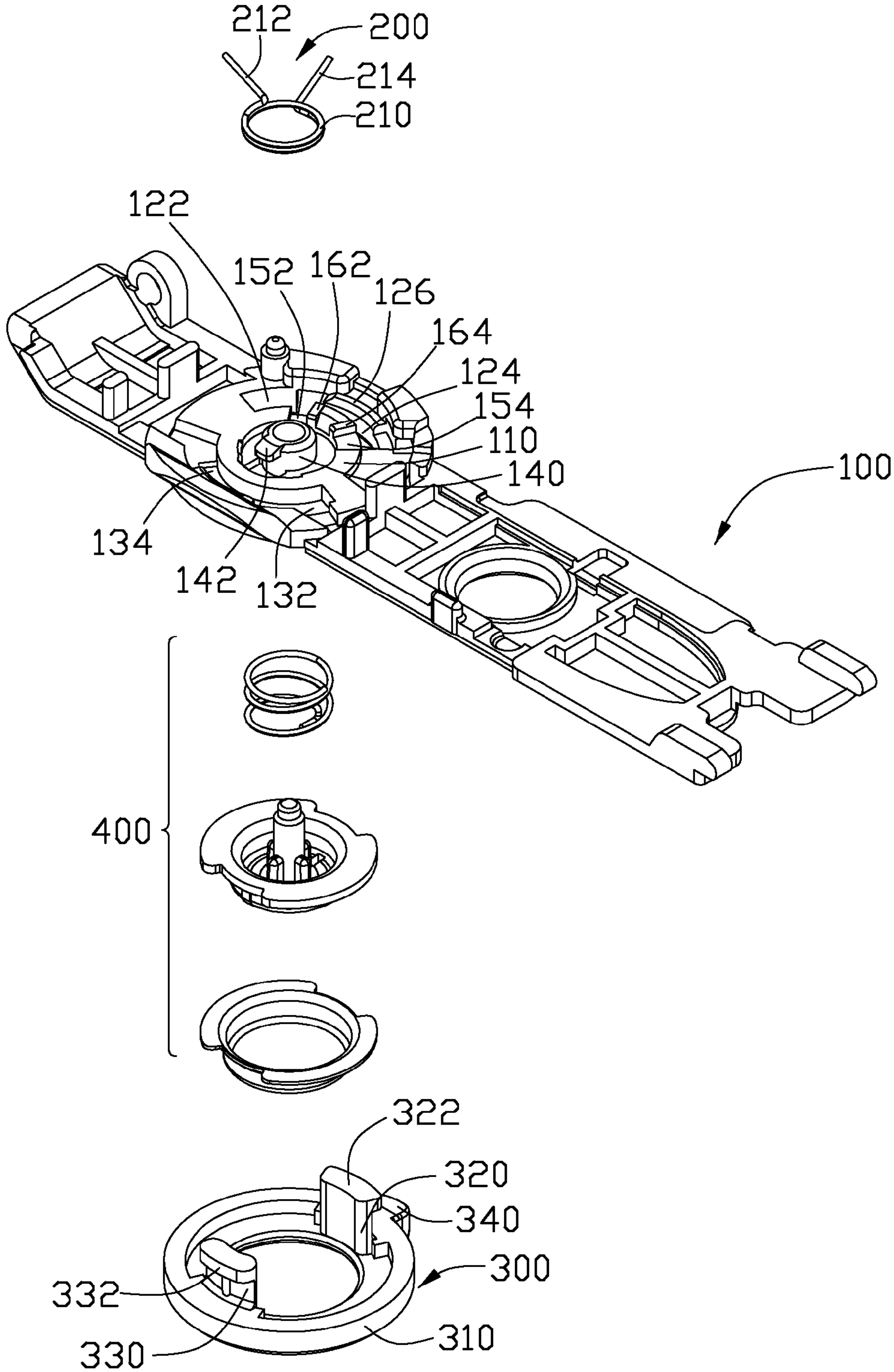
FIG. 2 is similar to FIG. 1, but viewed from a different angle.
Figure 3:
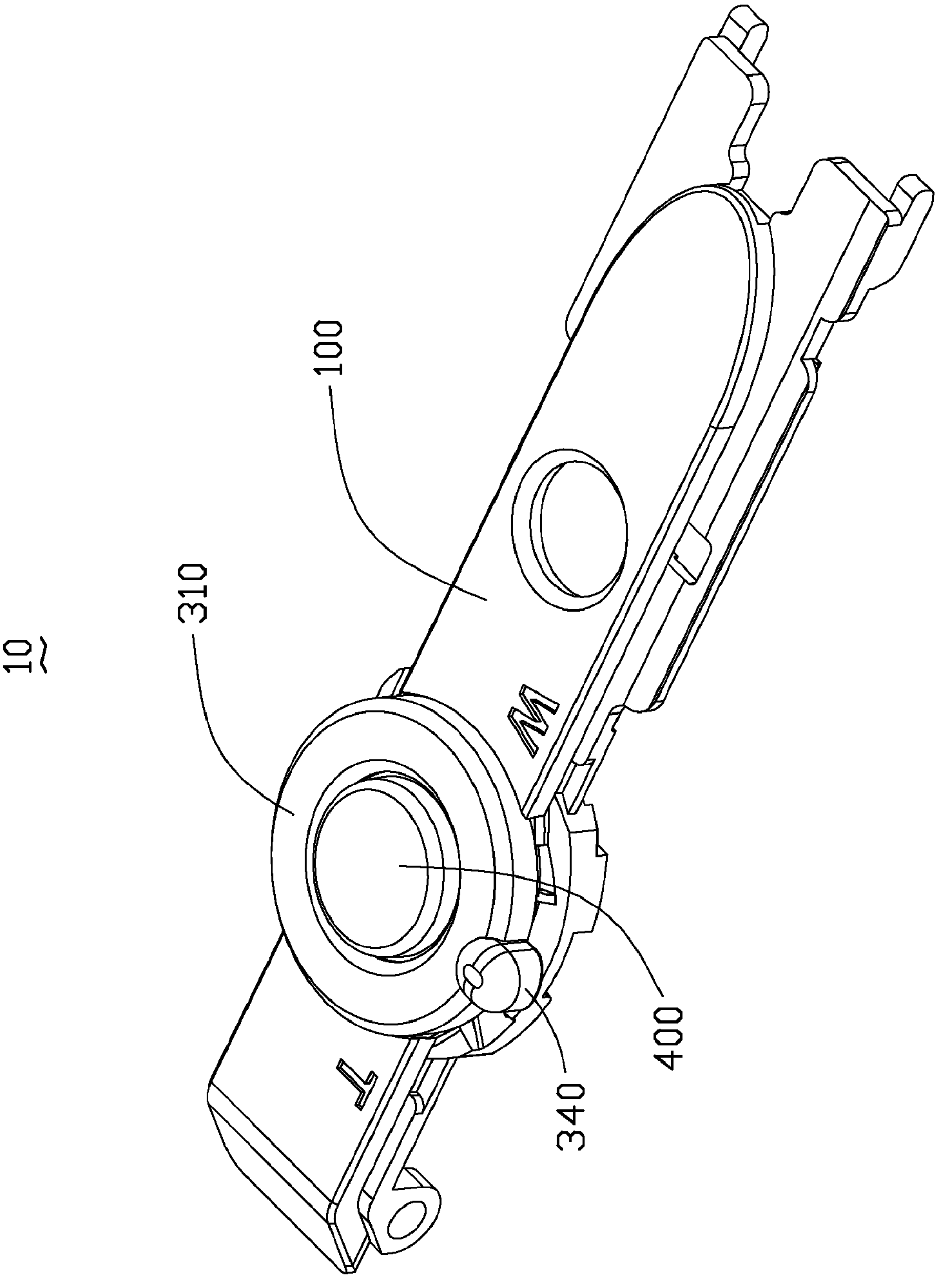
FIG. 3 is an assembled, isometric view of FIG. 1.
Figure 4:
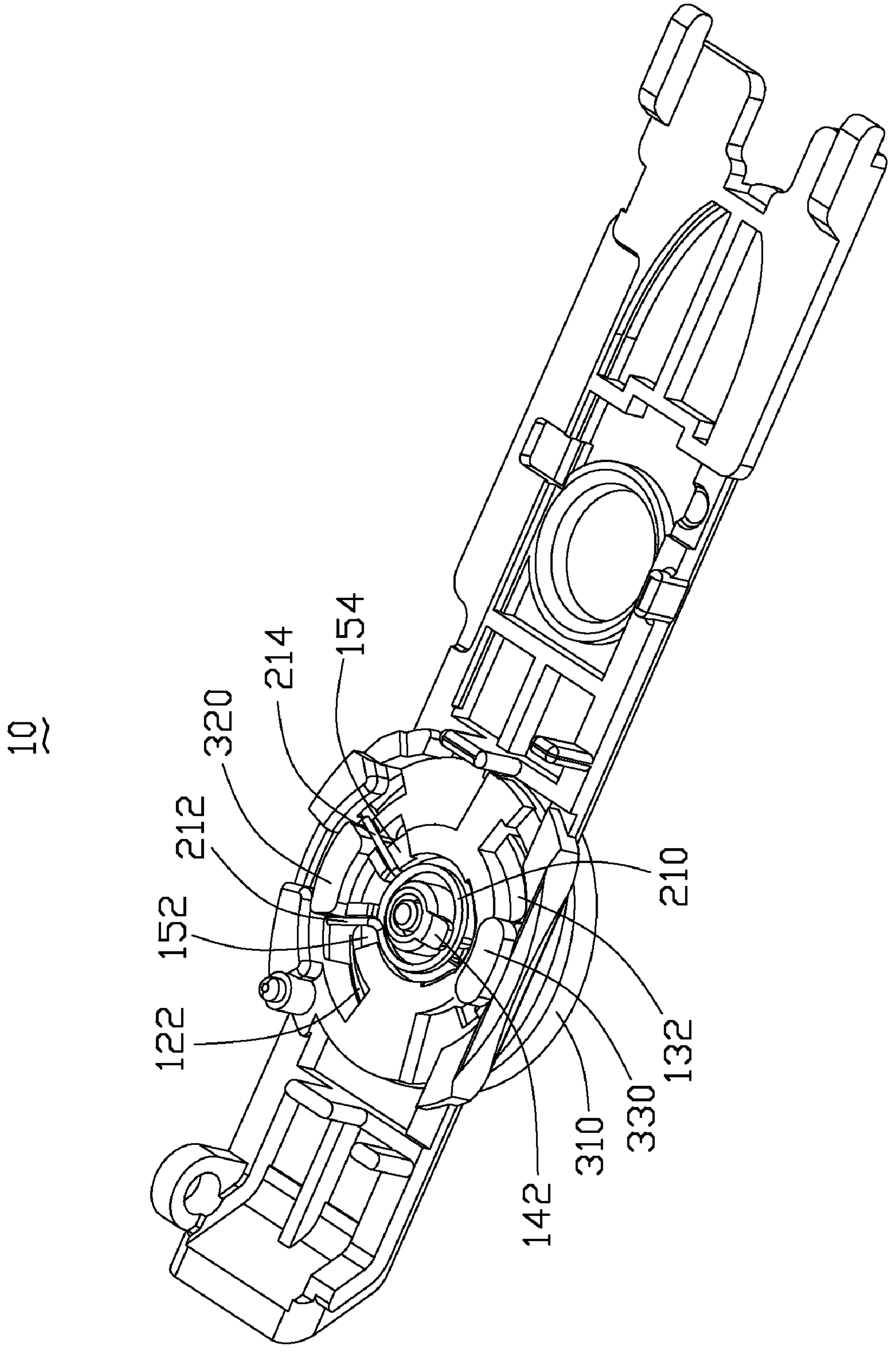
FIG. 4 is an assembled, isometric view of FIG. 2.

Referring to FIGS. 1-2, a zoom ratio adjusting switch 10 in accordance with a preferred present embodiment comprises a camera panel 100, a spring 200, and a rotary member 300. The rotary member 300 is rotatably secured to the camera panel 100. The spring 200 preferably is a torsion spring in the embodiment. The torsion spring 200 forces the rotary member 300 to remain in a neutral position and can restrain circumferential travel of the rotary member 300 between a tele-angle end position designated by a sign "T" and a wide-angle end position indicated by a sign "W". The torsion spring 200 can also facilitate return of the rotary member 300 to the neutral position.

The panel 100 forms a round region 110 and defines first and second elongated arch-shaped grooves 120, 130. The first and second grooves 120, 130 extend along and adjoin an outermost circumference of the round region 110. That is, innermost extremities of the first and second grooves 120, 130 are on a circumference of a circle. In the embodiment, the first groove 120 is near a front side of the panel 100 and the second groove 130 is near a rear side of the panel 100 in the embodiment. Each groove 120/130 comprises a wide part 122/132 and a narrow part 124/134. First and second arch-shaped flanges 126, 136 are formed on the panel 100, respectively adjoining the narrow parts 124, 134 away from the round region 110.

Primarily referring to FIG. 2, at a bottom side of the panel 100, a pole 140 extends from a central portion of the round region 110, perpendicular to the round region 110. A tab 142 is formed at a free end of the pole 140, parallel to the round region 110. The tab 142 is oriented toward the narrow part 134 of the second groove 130. A pair of recesses 152, 154 is defined in the round region 110. The recesses 152, 154 are separated by two ribs 162, 164, which extend along radial directions of the round region 110 and cooperatively enclose a fan-shaped area adjoining an innermost extremity of the narrow part 124 of the first groove 120.

The torsion spring 200 comprises a central loop 210, first and second arms 212, 214 extending from opposite ends of the loop 210. The arms 212, 214 are configured to sandwich the ribs 162, 164 of the round region 110 therebetween when the rotary member 300 is in neutral position.

The rotary member 300 comprises an annular body 310, first and second locking legs 320, 330 extending perpendicularly from a lower side of the annular body 310. A knob 340 is formed at an outer side of the annular body 310 near the first locking legs 320 for facilitating rotation of the rotary member 300. The locking legs 320, 330 are located diametrically opposite each other. The first locking leg 320 forms a foot 322 extending outwardly from a free end thereof. The foot 322 and the free end of first the locking leg 320 commonly define a planar bottom surface. The second locking leg 330 forms a foot 332 extending outwardly from a free end thereof. The foot 332 and the free end of the second locking leg 330 commonly define a planar bottom surface. The feet 322, 332 are parallel to the body 310. The flanges 126, 136 are disposed between the feet 322, 332 and the body 310, and prevent the locking legs 320, 330 from escaping from the panel 100 at the narrow parts 124, 134 of the first and second grooves 120, 130.

Referring to FIGS. 1-4, in assembly of the zoom ratio adjusting switch 10, the locking legs 320, 330 respectively extend though the wide parts 122, 132 of the grooves 120, 130 from a top side of the round region 110. The feet 322, 332 extend to a lower side of the round region 110. The annular body 310 of the rotary member 300 is rested on the top side of the round region 110. The rotary member 300 is rotated so that the locking legs 320, 330 enter the narrow parts 124, 134 of the grooves 120, 130, until the rotary member 300 is in neutral position. The loop 210 of the torsion spring 200 is sleeved around the pole 140 and restrained by the tab 142 from escaping from the pole 140. The first arm 212 is positioned in the recess 152 and the second arm 214 is positioned in the recess 154. When the torsion spring 200 is in a normal state, the rotary member 300 remains in a neutral position, the first and second arms 212, 214 sandwich the first leg 320 and the ribs 162, 164 therebetween.

Figure 5:
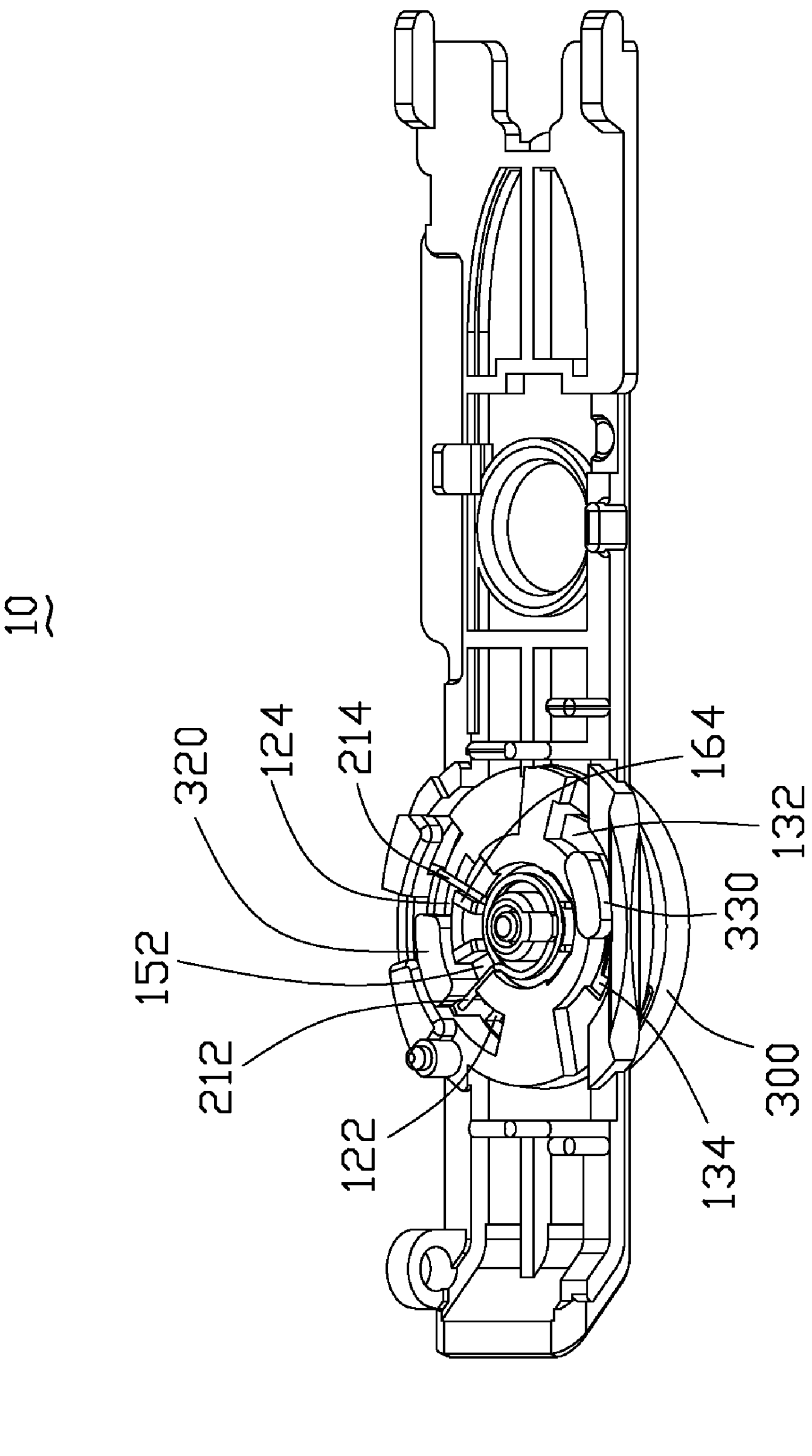
FIG. 5 is similar to FIG. 4, but a rotary member of the zoom ratio adjusting switch is turned to a tele-angle end position.

Particularly referring to FIGS. 1-2 and 5, rotating the rotary member 300 toward the tele-angle end position, the legs 320, 330 in the narrow parts 124, 134 move toward the wide parts 122, 132 of the first and second grooves 120, 130. The first leg 320 exerts a force on the first arm 212 and pushes the first arm 212 outwardly; thus, the first arm 212 expands outwardly relative to the second arm 214, which is blocked by the rib 164. However, travel of the first arm 212 is restrained in the recess 152. When the rotary member 300 arrives at the tele-angle end position, the first arm 212 restrains further movement of the legs 320, 330 toward the wide parts 122, 132 of the first and second grooves 120, 130. Releasing the rotary member 300, the first arm 212 of the torsion spring 200 rebounds and pushes the legs 320, 330 to move reversely to be sandwiched between the first and second arms 212, 214. The rotary member 300 thereby returns to the neutral position.

Figure 6:
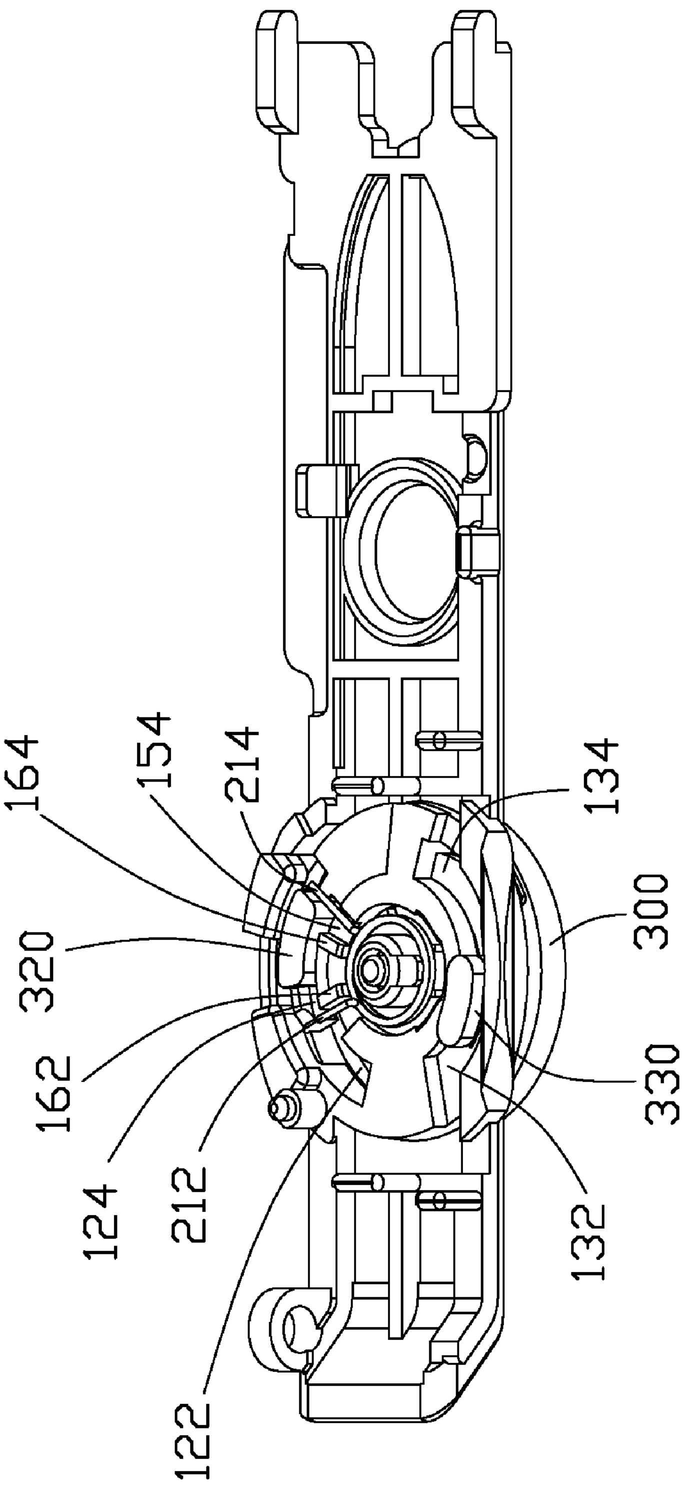
FIG. 6 is similar to FIG. 4, but a rotary member of the zoom ratio adjusting switch is turned to a wide-angle end position.

Referring to FIGS. 1-2 and 6, rotating the rotary member 300 toward the wide-angle end position, the legs 320, 330 in the narrow parts 124, 134 move farther away from the wide parts 122, 132 of the first and second grooves 120, 130. The first leg 320 exerts a force on the second arm 214 and pushes the second arm 214 outwardly; thus, the second arm 214 expands outwardly relative to the first arm 212, which is blocked by the rib 162. However, travel of the second arm 214 is restrained in the recess 154. When the rotary member 300 arrives at the wide-angle end position, the second arm 214 restrains further movement of the legs 320, 330 in the narrow parts 122, 132. It is understood that further movement of the legs 320, 330 can be restrained by innermost extremities of the narrow parts 124, 134 of the first and second grooves 120, 130. Releasing the rotary member 300, the second arm 214 of the torsion spring 200 rebounds and pushes the legs 320, 330 to move reversely to be sandwiched between the first and second arms 212, 214. The rotary member 300 thereby returns to the neutral position.

In the embodiment, the locking legs 320, 330 extend through the grooves 120, 130 without being deformed. This sufficiently decreases the risk of breaking the locking legs 320, 330 due to excessive force or deformation, compared with conventional zoom ratio adjusting switches employing elastic fingers. Additionally, rigid material can be used to manufacture the locking legs 320, 330, since the locking legs 320, 330 can extend through the grooves 120, 130 without deformation. Other components, such as a pressing button 400 can be positioned between the rotary member 300 and the camera panel 100.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A zoom ratio adjusting switch comprising:

a panel defining first and second grooves, each of the grooves comprising a wide part and a narrow part;

a rotary member comprising a body positioned to a top side of the panel and first and second locking legs extending from the body, the first and second locking legs being capable of extending though the wide parts and sliding in the narrow parts respectively, feet extending from the locking legs respectively at a bottom side of the panel and being restrained at the bottom side of the panel to prevent the first and second locking legs from escaping from the panel at the narrow parts of the first and second grooves; and a spring positioned to the bottom side of the panel and restraining travel of the first locking leg from the narrow part to the wide part of the first groove.

2. The zoom ratio adjusting switch as claimed in claim 1, wherein the spring comprises opposite first and second arms, and wherein the first locking leg is disposed between the first and second arms to remain the rotary member in a neutral position and restrain rotary travel of the rotary member between a tele-angle end position and a wide-angle end position.

3. The zoom ratio adjusting switch as claimed in claim 2, wherein the panel defines two separated recesses at the bottom side thereof, and wherein the first and second arms of the spring travel in the recesses respectively.

4. The zoom ratio adjusting switch as claimed in claim 2, wherein a pole extends perpendicularly from the bottom side of the panel and a tab is formed at the pole, and wherein the spring comprises a loop sleeved around the pole and restrained by the tab, the first and second arms extend from free ends of the loop.

5. The zoom ratio adjusting switch as claimed in claim 4, wherein the tab is parallel to the panel and oriented toward the narrow part of the second groove.

6. The zoom ratio adjusting switch as claimed in claim 1, wherein the panel forms flanges thereon adjoining the narrow parts of the first and second grooves, and wherein the flanges are disposed between the body of the rotary member and the feet of the rotary member to restrain the feet at the bottom side of the panel.

7. The zoom ratio adjusting switch as claimed in claim 1, wherein the first and second locking legs are located diametrically opposite each other.

8. The zoom ratio adjusting switch as claimed in claim 1, wherein each of the feet and the corresponding locking leg commonly defines a planar bottom surface.

9. The zoom ratio adjusting switch as claimed in claim 1, wherein a knob is formed at the body of the rotary member and near the first locking leg, for facilitating rotation of the rotary member.

10. The zoom ratio adjusting switch as claimed in claim 1, wherein a pressing button is positioned between the rotary member and the panel.

11. The zoom ratio adjusting switch as claimed in claim 1, wherein innermost extremities of the first and second grooves are on a circumference of a circle.

* * * * *